United States Patent
Lee

(10) Patent No.: US 8,483,683 B2
(45) Date of Patent: Jul. 9, 2013

(54) APPARATUS AND METHOD FOR CONNECTING NETWORK IN PORTABLE TERMINAL

(75) Inventor: Jung-Bae Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1048 days.

(21) Appl. No.: 11/873,854

(22) Filed: Oct. 17, 2007

(65) Prior Publication Data

US 2008/0102830 A1 May 1, 2008

(30) Foreign Application Priority Data

Oct. 25, 2006 (KR) .................. 10-2006-0103852

(51) Int. Cl.
*H04W 4/00* (2009.01)

(52) U.S. Cl.
USPC ............. 455/435.1; 455/434; 455/432.1; 455/432.3

(58) Field of Classification Search
USPC .............. 455/435.1–435.2; 370/338
See application file for complete search history.

(56) References Cited

U.S. PATENT DOCUMENTS

| 6,603,968 | B2 * | 8/2003 | Anvekar et al. | 455/433 |
| 7,047,007 | B1 | 5/2006 | Asadi | |
| 2003/0227892 | A1 | 12/2003 | Cabana | |
| 2005/0181734 | A1 * | 8/2005 | Coutts et al. | 455/67.16 |
| 2006/0092890 | A1 * | 5/2006 | Gupta et al. | 370/338 |
| 2007/0066304 | A1 * | 3/2007 | Lee | 455/436 |
| 2007/0223432 | A1 * | 9/2007 | Badarinath | 370/338 |

FOREIGN PATENT DOCUMENTS

| EP | 0 605 957 | 6/1999 |
| KR | 1020060037136 | 5/2006 |
| KR | 1020070025311 | 3/2007 |
| KR | 1020070030079 | 3/2007 |

* cited by examiner

*Primary Examiner* — Kathy Wang-Hurst
(74) *Attorney, Agent, or Firm* — The Farrell Law Firm, P.C.

(57) ABSTRACT

A method and an apparatus for connecting a network in a portable terminal. The method for connecting a network in a portable terminal includes searching a network from which a signal is received, receiving network identifying information from the searched network, retrieving connection information corresponding to the network identifying information, from network connection information stored in the portable terminal in advance, and setting the retrieved network connection information as the network connection information of the portable terminal.

8 Claims, 2 Drawing Sheets

APPARATUS AND METHOD FOR CONNECTING NETWORK IN PORTABLE TERMINAL

PRIORITY

This application claims priority under 35 U.S.C. §119 to a Korean Patent Application filed in the Korean Intellectual Property Office on Oct. 25, 2006 and assigned Serial No. 2006-103852, the contents of which are incorporated herein by reference.

BACKGROUND OF THE INVENTION

1. Field of the Invention

The present invention generally relates to an apparatus and a method for connecting a network in a portable terminal, and in particular, to an apparatus and a method for automatically connecting to a new network, without use of a separate setting of a user, when the portable terminal detects a change of network.

2. Description of the Related Art

Recently, customers' demands have increased for high-speed network services of a mobile phone, and mobile phones increasingly provide speedy wireless network services. As a result, uses of various network services, such as Wireless Application Protocol (WAP), Multimedia Message Service (MMS), electronic mailing (emailing), streaming, etc., are widespread.

A portable terminal generally stores a network connection setting before shipping, regarding a specific communication service provider and a country, so a user is able to use network services within the set network connection.

Accordingly, in order for a portable terminal to connect to another network and to use network services therein, conventionally, a user has to set a connection to the new network. That is, when a user leaves a country set in the portable terminal, or when a Subscriber Identification Module (SIM) card of a different communication operator is inserted in the portable terminal, a new network, which is different from the existing network, is detected in the portable terminal, and the user has to set network connection information corresponding to the detected network to use network services therein.

However, the above conventional ways of changing the connection information setting of a portable terminal are inconvenient, because when the network detected by the portable terminal is changed, the user has to obtain connection information of the newly detected network, while the user cannot use network services until the user changes the network connection setting.

SUMMARY OF THE INVENTION

The present invention substantially solves at least the above problems and/or disadvantages and provides at least the advantages below. Accordingly, an aspect of the present invention is to provide an apparatus and a method for connecting to a network in a portable terminal.

Another aspect of the present invention is to provide an apparatus and a method for connecting to a network in a portable terminal, in which network connection information is automatically set when a network detected by the portable terminal is changed.

According to an aspect of the present invention, a method for connecting a network in a portable terminal is provided. The method includes searching a network from which a signal is received, receiving network identifying information from the searched network, retrieving network connection information corresponding to the network identifying information, from network connection information stored in the portable terminal in advance, and setting the retrieved network connection information as the network connection information of the portable terminal.

According to another aspect of the present invention, an apparatus for connecting a network in a portable terminal is provided. The apparatus includes a storage unit for storing network connection information categorized by countries and network providers, a control unit for retrieving network connection information corresponding to the searched network, by using network identifying information received from the searched network, and a connection setting unit for setting the retrieved connection information of the searched network as the network connection information of the portable terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

An apparatus and a method of automatically setting network connection information using a country and service provider information, when a network detected by a portable terminal is changed, will be explained below.

Figure 1:
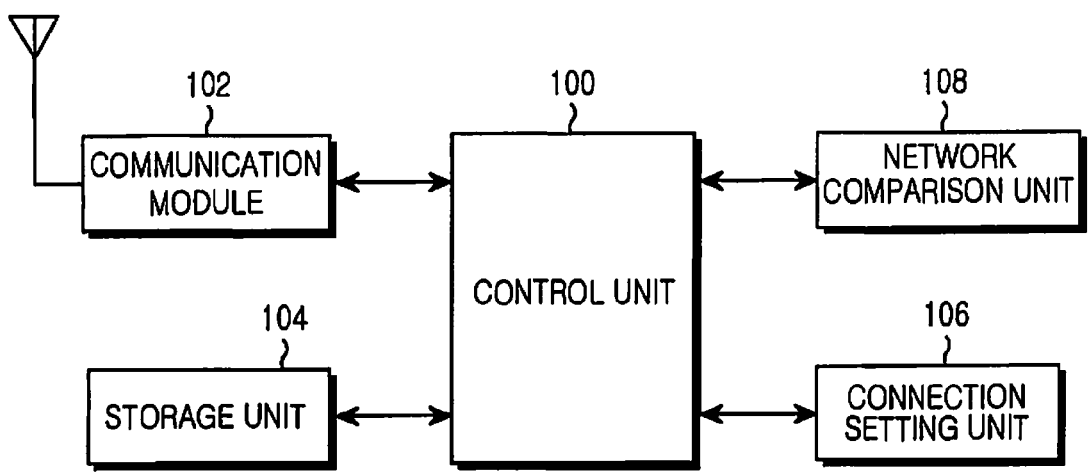
FIG. 1 is a block diagram of a portable terminal according to the present invention.

FIG. 1 shows a portable terminal according to the present invention. The portable terminal includes a control unit 100, a communication module 102, a storage unit 104, a connection setting unit 106, and a network comparison unit 108.

Referring to FIG. 1, the control unit 100 controls and processes the functions for audio telephony and data communication of the portable terminal, and according to the present invention, the control unit 100 also controls and processes the functions for automatically setting network connection information corresponding to a network sending a signal. In other words, the control unit 100 receives network identifying information, which is received at the communication module 102 from a base station of a network detected by the portable terminal, outputs the network identifying information to the network comparison unit 108, and upon receiving a network mismatching signal from the network comparison unit 108, searches and retrieves the corresponding network connection information from the storage unit 104, and outputs the retrieved network connection information to the connection setting unit 106. The 'network identifying information' includes a Mobile Country Code (MCC) representing a country of the network, and a Mobile Network Code (MNC) representing a network service provider.

The communication module 102 performs the function of transmitting and receiving wireless signal of data being input and output over an antenna. For example, in transmission, the communication module 102 performs operations including channel coding and spreading of data to be transmitted, converting a baseband signal into a Radio Frequency (RF) signal, and transmitting the RF signal over the antenna. In reception, the communication module 102 performs operations including converting a received RF signal into a baseband signal, and recovering the data by de-spreading and channel decoding the baseband signal. According to the present invention, the communication module 102 also receives the network identifying information from a base station of the detected network, and provides the control unit 100 with the received information.

The storage unit 104 includes a read only memory (ROM), a random access memory (RAM), and a flash ROM, and stores microcodes and reference data of the programs for processing and controlling of the control unit 100, temporary data generated during execution of the programs, and other updatable data for future use. In particular, according to the present invention, the storage unit 104 stores network connection information to connect to each of the networks categorized by the countries and network providers. The network connection information of each of the countries and the network providers may be tabulated and stored according to the network identifying information including MCC and MNC. The storage unit 104 may store, as the network connection information, an access name, an identification (ID), a password, a protocol, a gateway, an address, a proxy address, a port, a Domain Name Server (DNS) address, etc. The network connection information may further include a Post Office Protocol 3 (POP3) and a Simple Mail Transfer Protocol (SMTP) server address, to support emailing service of the network services of the portable terminal.

When the network connection information is input from the control unit 100, the connection setting unit 106 analyzes the received network connection information and sets the network connection information in the portable terminal. For example, the connection setting unit 106 may receive from the control unit 100 the information to connect to the corresponding network, such as an access name, an ID, a password, a protocol, a gateway, an address, a proxy address, a port, a DNS address, etc., and set the received values as the network connection information of the portable terminal.

The network comparison unit 108 receives the network identifying information from the control unit 100, and determines whether the currently detected network matches the previously connected network by comparing the received network identifying information with the predetermined network identifying information, and provides the control unit 100 with the result of determination.

Figure 2:
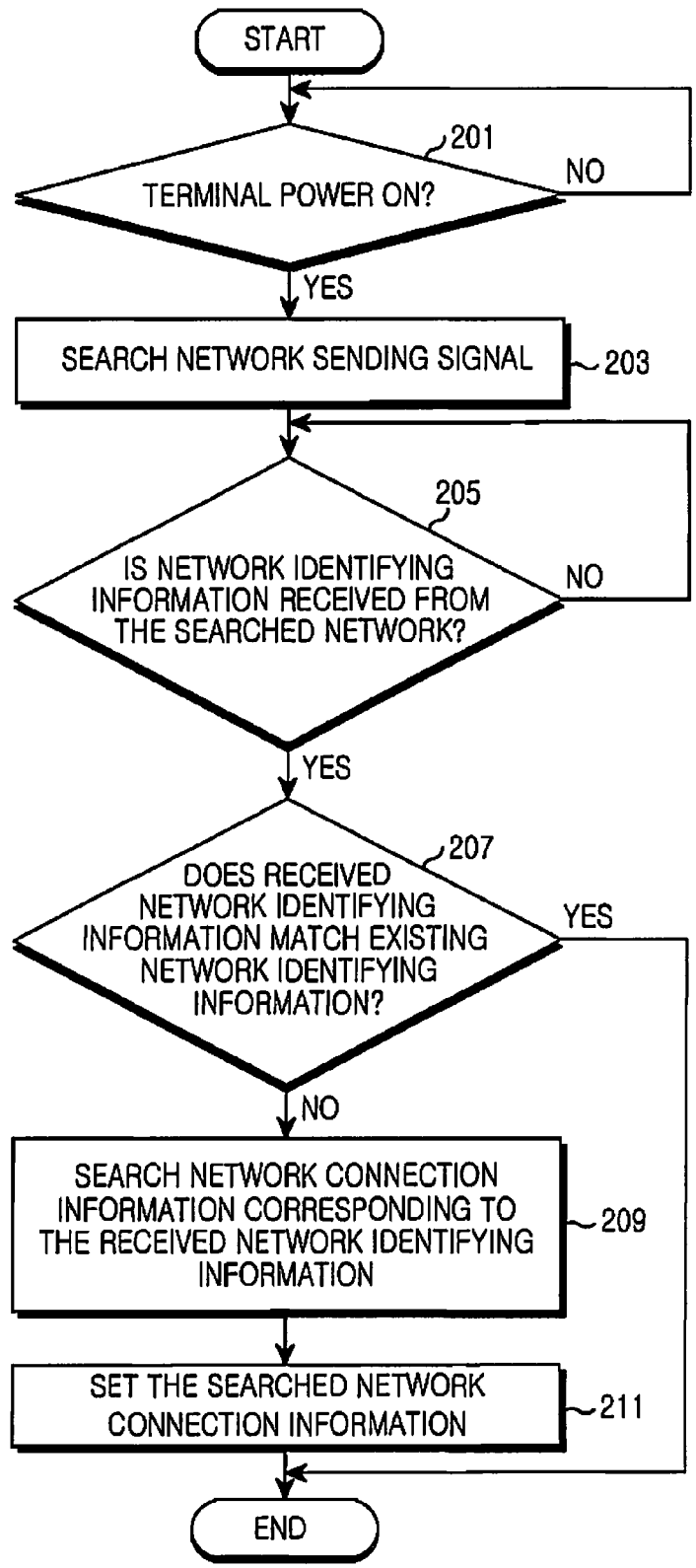
FIG. 2 is a flowchart of a process of a portable terminal connecting to a network according to the present invention.

FIG. 2 shows a process of a portable terminal connecting to a network according to the present invention. In FIG. 2, the portable terminal determines whether power is on in step 201. If the portable terminal is turned on, the portable terminal searches a network from which the portable terminal is currently receiving a signal in step 203.

Thereafter, the portable terminal proceeds to step 205 and determines whether the network identifying information including MCC and MNC is received from the searched network. Upon determination that the network identifying information is received, the portable terminal proceeds to step 207 and determines whether the received network identifying information matches the previous network identifying information stored in the portable terminal by comparing the network identifying information. In other words, the portable terminal determines whether the currently searched network is identical with the network to which the portable terminal is previously connected.

If the network identifying information match, the portable terminal determines that the searched network is the same network that is previously connected, and ends the process according to the present invention.

If the network identifying information do not match, the portable terminal determines that the searched network is different from the previously connected network, proceeds to step 209, and searches for the network connection information corresponding to the network identifying information from the storage unit 104. In other words, the portable terminal searches the network connection information, such as an access name, an ID, a password, a protocol, a gateway, an address, a proxy address, a port, a DNS server address, etc., corresponding to the network identifying information including MCC and MNC.

After completing the searching of the network connection information, the portable terminal in step 211 sets the network connection information searched from the storage unit 104 as the network connection information of the portable terminal, so as to use the services provided by the searched network, and then ends the process according to the present invention.

Although the above description explained with reference to FIG. 2 relates to an example when the portable terminal is powered on, this is only for the purpose of example, and therefore, the portable terminal may also automatically set the network connection information and use the new network according to the present invention, when the portable terminal in on state is moved to a different area where a different network is used.

As explained above, by automatically connecting to a new network using the network identifying information including MCC and MNC, network connection information is automatically set in a portable terminal when a user of the portable terminal moves to a different country or uses a network of different network provider, so the user can use service functions of the new network, without having to separately manipulate the portable terminal.

Alternate embodiments of the present invention may also include computer readable codes on a computer readable medium. A computer readable medium may include any data storage device that can store data that can be read by a computer system. Examples of a computer readable medium include, for example, magnetic storage media (such as ROM, floppy disks, and hard disks, among others), optical recording media (such as CD-ROMs or DVDs), and storage mechanisms such as carrier waves (such as transmission through the Internet). A computer readable medium can also be distributed over network coupled computer systems so the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for connecting a network in a portable terminal, the method comprising:
   searching the network;
   receiving network identifying information from the searched network;

determining whether the searched network is identical with a previous connected network, by using the network identifying information;

retrieving network connection information corresponding to the network identifying information, from network connection information pre-stored in the portable terminal, if the searched network is different from the previous connected network; and setting the retrieved network connection information as the network connection information of the portable terminal, wherein the network connection information pre-stored in the portable terminal includes network connection information of a network that is not previously connected.

2. The method of claim 1, wherein the network identifying information includes at least one of a Mobile Country Code (MCC) and a Mobile Network Code (MNC) of the network.

3. The method of claim 1, wherein the network connection information includes at least one of an access name, an identification (ID), a password, a protocol, a gateway, an address, a proxy address, a port, a Domain Name Server (DNS) address, a Post Office Protocol 3 (POP3), and a Simple Mail Transfer Protocol (SMTP) server address.

4. An apparatus for connecting a network in a portable terminal, the apparatus comprising:

a storage unit for pre storing network connection information categorized by countries and network providers, wherein the network connection information includes network connection information of a network that is not previously connected;

a network comparison unit for determining whether a searched network is identical with a previous connected network, by using network identifying information received from the searched network;

a control unit for retrieving network connection information corresponding to the searched network, by using network identifying information, if the searched network is different from the previous connected network; and a connection setting unit for setting the retrieved connection information of the searched network as the network connection information of the portable terminal.

5. The apparatus of claim 4, wherein the network identifying information includes at least one of a Mobile Country Code (MCC) and a Mobile Network Code (MNC) of the network.

6. The apparatus of claim 4, wherein the network connection information includes at least one of an access name, an identification (ID), a password, a protocol, a gateway, an address, a proxy address, a port, a Domain Name Server (DNS) address, a Post Office Protocol 3 (POP3), and a Simple Mail Transfer Protocol (SMTP) server address.

7. A portable terminal for connecting a network, the portable terminal comprising:

means for searching the network;

means for receiving network identifying information from the searched network;

means for determining whether the searched network is identical with a previous connected network, by using the network identifying information;

means for retrieving network connection information corresponding to the network identifying information, from network connection information pre-stored in the portable terminal, if the searched network is different from the previous connected network; and means for setting the retrieved network connection information as the network connection information of the portable terminal, wherein the network connection information pre-stored in the portable terminal includes network connection information of a network that is not previously connected.

8. A non-transitory computer-readable recording medium having recorded thereon a program for connecting a network in a portable terminal, the computer-readable recording medium comprising:

a first code segment for searching the network;

a second code segment for receiving network identifying information from the searched network;

a third code segment for determining whether the searched network is identical with a previous connected network, by using the network identifying information;

a fourth code segment for retrieving network connection information corresponding to the network identifying information from network connection information pre-stored in the portable terminal, if the searched network is different from the previous connected network; and a fifth code segment for setting the retrieved network connection information as the network connection information of the portable terminal, wherein the network connection information pre-stored in the portable terminal includes network connection information of a network that is not previously connected.

* * * * *